United States Patent
Hishiki et al.

(10) Patent No.: US 6,408,195 B1
(45) Date of Patent: Jun. 18, 2002

(54) SEMICONDUCTOR INTEGRATED CIRCUIT FOR COMMUNICATION AND BATTERY SAVING METHOD FOR THE SAME

(75) Inventors: Yuji Hishiki; Isamu Fujii; Shinichi Idomukai, all of Koto-ku (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/202,915

(22) PCT Filed: Jul. 3, 1997

(86) PCT No.: PCT/JP97/02305

§ 371 (c)(1),
(2), (4) Date: Feb. 14, 2000

(87) PCT Pub. No.: WO98/01966

PCT Pub. Date: Jan. 15, 1998

(30) Foreign Application Priority Data

| | | |
|---|---|---|
| Jul. 4, 1996 | (JP) | 8-175262 |
| Jan. 28, 1997 | (JP) | 9-014380 |
| Mar. 25, 1997 | (JP) | 9-072266 |

(51) Int. Cl.[7] .............. G06F 13/00; H04B 1/38
(52) U.S. Cl. .............. 455/574; 455/136; 455/138
(58) Field of Search .............. 455/574, 575, 455/136, 138, 139, 343

(56) References Cited

U.S. PATENT DOCUMENTS

| | | | | | |
|---|---|---|---|---|---|
| 4,638,451 | A | * | 1/1987 | Hester et al. | 364/900 |
| 5,221,863 | A | * | 6/1993 | Motegi | 307/269 |
| 5,396,521 | A | * | 3/1995 | Minami | 455/260 |
| 5,625,311 | A | * | 4/1997 | Nakatsu | 327/293 |
| 5,809,259 | A | * | 9/1998 | Mitsuishi | 395/306 |
| 5,930,488 | A | * | 7/1999 | Mitsuishi | 395/306 |

* cited by examiner

Primary Examiner—Daniel Hunter
Assistant Examiner—Thuan T. Nguyen
(74) Attorney, Agent, or Firm—Adams & Wilks

(57) ABSTRACT

An IC for communication includes a single oscillating circuit, which is capable of flexibly dealing with the change of data rate or data processing load, and is produced at a low cost and consumes low electric power. In the IC for communication, a frequency multiplying circuit(61) is inserted between the output of an oscillating circuit(1) and a micro-controller circuit(69), or a frequency dividing circuit(2) is inserted between the oscillating circuit(1) and a data receiving circuit(3). A receiving address is stored in a dual port RAM(16). Further, by controlling a receiving frequency of synchronous codes, battery saving efficiency is increased.

19 Claims, 16 Drawing Sheets

F I G. 8
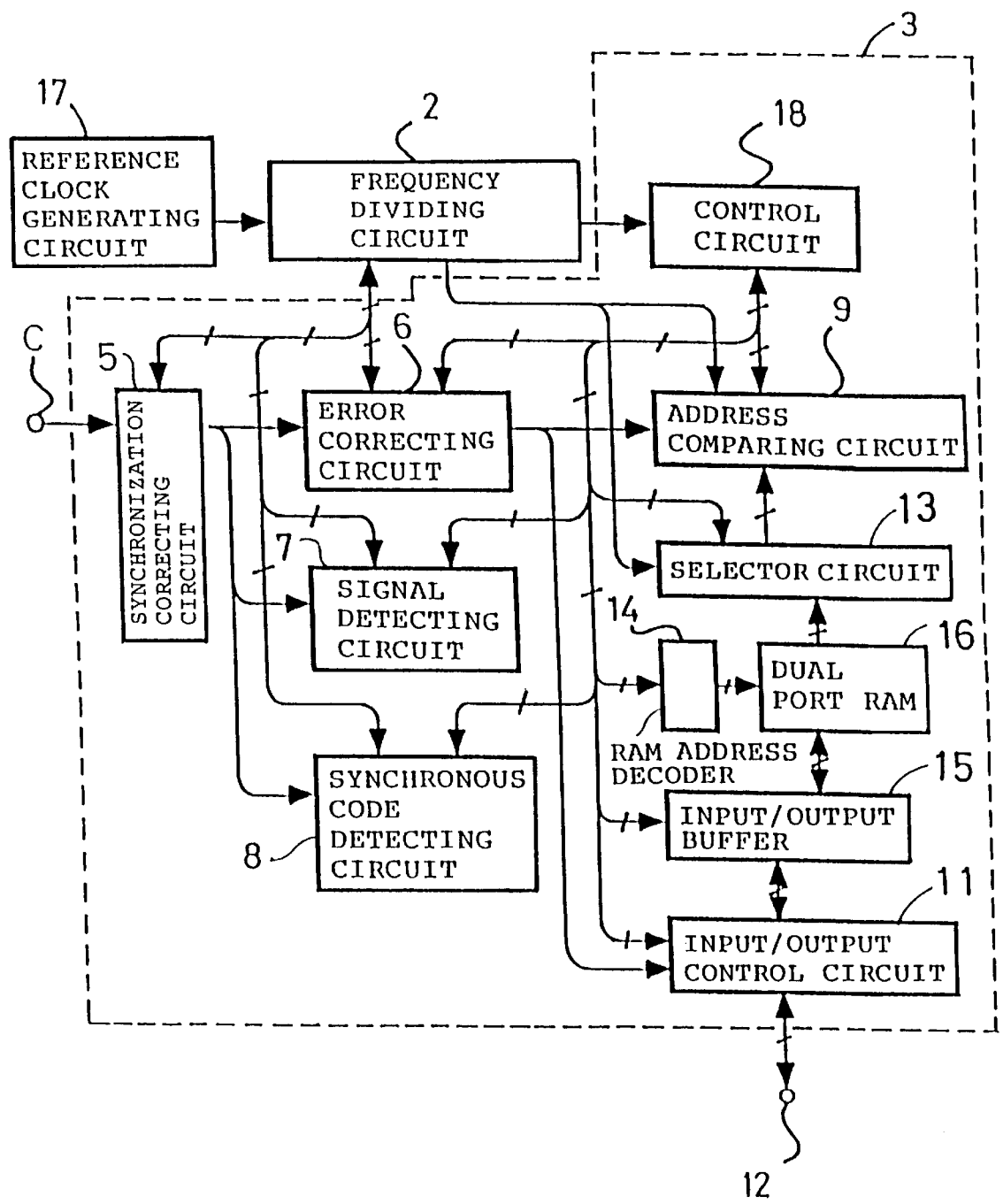

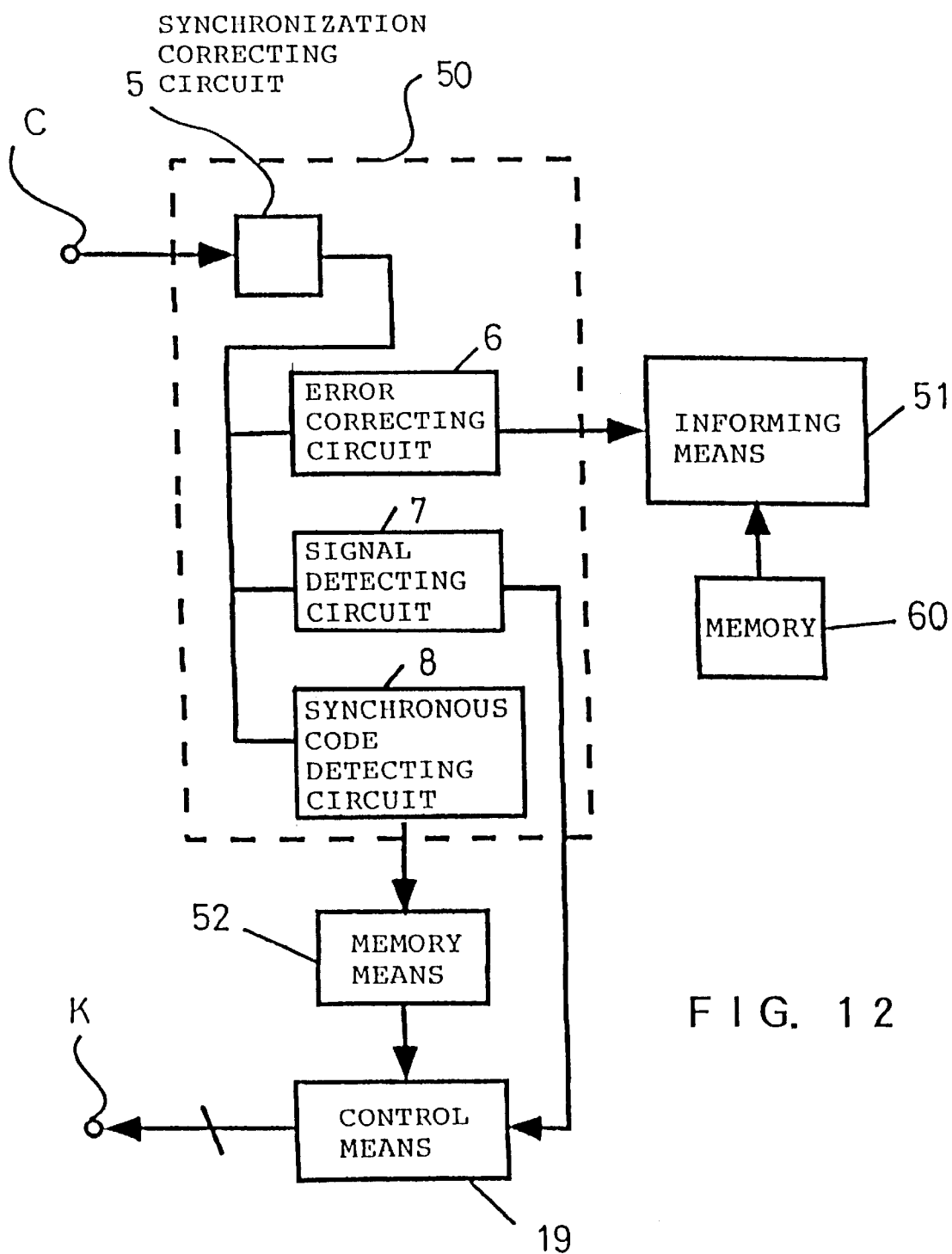
F I G. 1 2

SEMICONDUCTOR INTEGRATED CIRCUIT FOR COMMUNICATION AND BATTERY SAVING METHOD FOR THE SAME

TECHNICAL FIELD

The present invention relates to a semiconductor integrated circuit (hereinafter referred to as an IC) in which a protocol decoding function and a micro-controller function, which are used for a serial data receiving device typified by a wireless call device (hereinafter referred to as a pager), are integrated.

Also, the present invention relates to an IC having a communication protocol decoding function used for a serial data receiving device typified by a pager or the like.

Further, the present invention relates to an IC having a protocol decoding function used for a serial data receiving device typified by a pager or the like and a method of saving a battery thereof.

BACKGROUND ART

A portable serial data receiving device, used as a pager or the like, having a block structure as shown in FIG. 2 is conventionally used. This receiving device includes a system clock generating circuit 4 for generating timing signals on receiving an output of an oscillating circuit 1, a data receiving circuit 3 for synchronously making entry of data inputted through a serial data input terminal C on receiving the clock output, and for checking an ID and detecting and correcting an error for the entered data, that is, the data receiving circuit having a so-called protocol decoding function, and a micro-controller circuit 69 for controlling the data receiving circuit 3 on receiving the clock from the system clock generating circuit 4, for making entry of the received data to process the data, and at the same time, for informing the outside of the reception.

A resonator (normally crystal resonator) is connected between input and output terminals A and B of the oscillating circuit 1. The oscillation output is used as a reference clock for synchronization of the data receiving circuit 3 and for operating a processing circuit. Also, the oscillation output is inputted into the system clock generating circuit 4 and is converted into a system clock necessary for the operation of the micro-controller circuit 69.

A pager as an example will be described. In FIG. 2, data inputted through the data input terminal C is entered in the data receiving circuit 3. At that time, synchronization is made by using the output of the oscillating circuit 1. When the data receiving circuit 3 confirms the data reception by checking the ID, it requests interruption of the micro-controller circuit 69, and starts to make entry of the data. The entered data is entered into the micro-controller circuit 69 which has started its operation by receiving the interruption request, and is stored or displayed as occasion demands. The micro-controller circuit 69 is also provided with an output terminal D through which an alarm sound is given to the outside at the data reception or an LED is turned on, so that it outputs an alarm signal as occasion demands.

In this way, data processing is executed. However, in the structure shown in FIG. 2, since the output of the oscillating circuit 1 is connected to both the data receiving circuit 3 and the system clock generating circuit 4, as a data rate becomes fast, a processing time of the micro-controller is required to be shortened.

FIG. 3 shows another prior art in which two oscillating circuits are included. The respective outputs of oscillating circuits 1 and 67 are inputted into a clock switching circuit 68. The clock switching circuit 68 is controlled by a control signal G of the micro-controller circuit 69, and the output thereof is inputted into the system clock generating circuit 4. Since other components are common to those of the example shown in FIG. 2, they are designated by similar reference numerals or symbols and the description thereof will be omitted. In the circuit shown in FIG. 3, in the case where a processing speed of the micro-controller circuit 69 is insufficient, the oscillating frequency of the oscillating circuit 67 is increased and a clock is changed as occasion demands, so that the speed of the system clock can be increased.

Also, a portable serial data receiving device, used as a pager or the like, having a block structure as shown in FIG. 9 is conventionally used. The receiving device includes a frequency dividing circuit 2 for dividing the output of a reference clock generating circuit 17; a control circuit 18 for generating a control signal on receiving the output of the circuit 2; a synchronization correcting circuit 5 connected to a data input terminal C and operating with the receipt of a clock from the frequency dividing circuit 2; an error correcting circuit 6, a signal detecting circuit 7 and a synchronization code detecting circuit 8 which are operated by receiving the output of the circuit 5 and the outputs of the frequency dividing circuit 2 and the control circuit 18; an address comparing circuit 9 receiving the output of the frequency dividing circuit 2 and the control circuit 18 and checking the outputs of the error correcting circuit 6 and an address memory circuit 10; and an input/output control circuit 11 connected to the address memory circuit 10, receiving the outputs of the control circuit 18 and the error correcting circuit 6, and connected to an input/output terminal 12. In FIG. 9, all components other than the reference clock generating circuit 17 and the frequency dividing circuit 2 will be collectively referred to as a data receiving circuit 3.

FIGS. 10 and 11 show a conventional structure of the address memory circuit 10 in FIG. 9. FIG. 10 shows an example of the conventional address memory circuit formed by using a shift register. When one address is composed of n bits, it is stored in the shift register in the drawing. Since a plurality of addresses are generally assigned to a receiving device, a plurality of register each shown in the drawing are actually provided. In this case, an input 30 is selected by a switching circuit, and address data is written synchronously with a clock 20. The output is also selected by the switching circuit and inputted into the address comparing circuit. When n is a small value, outputs 331 to 30+n in the drawing are simultaneously compared with each other, and comparison is sequentially made by switching for every address register. On the other hand, when n is a large value, a terminal corresponding to 31 in the drawing is first selected for all address registers, and the output is inputted into the address comparing circuit. Next, terminals are sequentially switched to 32, 33, and the outputs till 30+n are inputted into the address comparing circuit. The sequence of selection may be opposite to this.

FIG. 11 shows an example of the conventional address memory circuit formed by using latches. In the drawing, a latch is written and read through an 8-bit bus line. In the drawing, the number of bits of the address is 18, and an enable bit of the address is added thereto. The output of the address memory circuit is inputted, as Q(0:18), into the address comparing circuit.

As described above, since a plurality of addresses are normally used, a plurality of circuits each shown in the drawing are used and switched by a selector to input an address into the address comparing circuit. The sequence of switching is executed for each address as described before or executed for each of the same bit for a plurality of addresses.

As a protocol decoding IC for communication used for a pager or the like, one shown in FIG. 13 is conventionally used. In the drawing, a signal inputted through an input terminal C is processed by a decoding means 50, and is outputted as data. This decoding process is referred to as protocol decoding. In this prior art, the decoding means 50 includes a synchronization correcting circuit 5, and an error correcting circuit 6, a signal detecting circuit 7, and a synchronization code detecting circuit 8 which receive the output of the circuit 5. The output of the decoding means 50 is inputted into an informing means 51 and a control means 19. The informing means 51 is connected to a memory 60 which stores a number of its self, and when coincidence of the number and the receiving data is detected, it is informed. On the other hand, the control means 19 outputs a timing signal to the outside. The timing signal is used to make a receiving device execute an intermittent operation, and is referred to as a battery saving signal. The signal received by the receiving device is demodulated and detected, and is inputted into the input terminal C.

FIG. 14 shows timing of an intermittent operation for a POCSAG system as an example. In the drawing, FIG. 14(a) shows a transmission signal of the POCSAG. Repetitive pattern of 1, 0, 1, 0, . . . referred to as a preamble is first transmitted, and subsequently, a synchronous code (SC) is transmitted. At the fixed timing (timing of self frame) between the synchronous code and the next synchronous code, an address (ADR) as the number of a self station and a message (M) subsequent thereto are transmitted.

FIG. 14(1) shows a battery saving signal which is conventionally known. In the drawing, when the signal level is "H", a receiving device operates. First, when the preamble signal is detected, the receiving device continues to receive until the synchronous code is detected, and after the synchronous code is detected, the self frame and the synchronous code are alternately received. Then, when the self address is found in the self frame, the message is sequentially received.

FIGS. 14(2) and 14(3) show signal waveforms based on a battery saving method disclosed in Japanese Patent Unexamined Publication No. Sho 63-13432. In FIG. 14(2), after the synchronous code is once detected, synchronization detection is executed by only the self frame. In FIG. 14(3), after the synchronous code is once detected, synchronization detection is carried out by only self frame, and reception for detecting the preamble is carried out also at the timing of the synchronous code.

However, in the conventional serial data receiving device as shown in FIG. 2, it is impossible to increase an oscillation frequency to shorten a processing time of the micro-controller. Because the reference clock is changed according to this, and the clock of the data receiving circuit is also changed, so that the timing signal of the data receiving circuit is changed. Accordingly, the oscillation frequency is selected in accordance with the data receiving circuit. As a result, there arises a problem that a processing speed of the micro-controller may be insufficient.

In the serial data receiving device shown in FIG. 3, in order to shorten the processing time of the micro-controller, it is necessary to provide a separate oscillating circuit to switch a clock, so that there are problems that consumed electric power is increased, and at the same time, software becomes complicated, which causes disadvantage in cost.

In the conventional serial data receiving device shown in FIGS. 9 to 11, there is a problem that when the number of received addresses increases, the increase of a circuit scale becomes remarkable. For example, in the pager, according to the increase and diversification of services, the number of necessary addresses increases in recent years. Thus, the circuit scale of an IC necessary for the receiving device also tends to increase. Particularly, a memory circuit of address comes to occupy a large part of the IC.

Accordingly, there has been a problem to lessen the area of an address memory circuit occupying an IC without deteriorating the functional quality.

The conventional receiving method as shown in FIG. 14 has had a problem described below. First, as for FIG. 14(1), consumed electric power becomes large since a synchronous code is detected each time. Since almost all power consumption of a pager is made at a receiving portion, it is important to decrease an operation time of the receiving device even if only slightly.

One of objects of FIGS. 14(2) and 14(3) is to deal with such a problem. In this case, in FIGS. 14(2) and 14(3), the operation of synchronization depends on the address of a self frame. That is, by the coincidence of address of the self frame, synchronization is confirmed. In this case, if there is a base station for transmitting messages as the need arises while the synchronous stated is always maintained by synchronous codes after a preamble is first transmitted, there is a possibility that synchronization becomes impossible to be maintained.

Disclosure of Invention

In view of these problems of the prior art, an object of the present invention is to provide a semiconductor integrated circuit for communication which is able to deal with a base station executing transmission while always maintaining synchronization, and to improve the efficiency of battery saving in a waiting state.

In the present invention, in order to solve these problems of the prior art, the output of an oscillating circuit is supplied to a data receiving circuit through a frequency dividing circuit, while the oscillating circuit output is directly supplied to a system clock generating circuit of a micro-controller. The oscillation frequency of the oscillating circuit is made X times higher, and the dividing ratio of the frequency dividing circuit is made 1/X.

Also, in the present invention, in order to solve these problems of the prior art, as another solving means, the output of a reference clock generating source is directly supplied to a data receiving circuit while being supplied to a system clock generating circuit of a micro-controller through a frequency multiplying circuit. The multiplying ratio of the multiplying circuit is made Y.

In a serial data receiving device using the thus constructed semiconductor integrated circuit for communication, even in the case where a data rate of communication is made high and the increase of processing speed of the micro-controller is required, it is possible to make the processing speed of the micro-controller X times higher and Y times higher, respectively.

Further, in the present invention, in order to solve these problems of the prior art, an address memory circuit is formed of a dual port RAM.

The area of the thus constructed address memory circuit on an IC becomes remarkably small as compared with a conventional case using a shift register or latch. On the other hand, since reading of data can be carried out at the similar timing to the conventional case where the shift register or latch is used, the same function can be realized using the same clock of the conventional case.

Further, in the present invention, in order to solve these problems, a memory means is added to a conventional decoding means, so that when a synchronous code is detected, it is stored, and the receiving device is stopped at a next synchronous code. Then, synchronization is again confirmed at a further next synchronous code. On the contrary, even in the case where the synchronous code is not detected, it is stored and the reception is executed at the timing of an immediately next synchronous code.

BRIEF DESCRIPTION OF THE DRAWINGS

FIG. 8 is a block diagram showing an embodiment of a semiconductor integrated circuit for communication according to the present invention;

FIG. 12 is a block diagram showing an IC for communication according to the present invention;

FIG. 14 shows output waveforms of conventional timing signals, in which FIG. 14(a) shows a transmission signal, FIG. 14(1) shows an output waveform of a conventional timing signal, FIG. 14(2) shows an output waveform of a conventional timing signal, and FIG. 14(3) shows an output waveform of a conventional timing signal ;

FIG. 15 shows output waveforms of timing signals according to the present invention, in which FIG. 15(a) shows a transmission signal, FIG. 15(1) shows an output waveform of a timing signal according to the present invention, and FIG. 15(2) shows an output waveform of a timing signal according to the present invention.

BEST MODE FOR CARRYING OUT OF THE INVENTION

Figure 1:
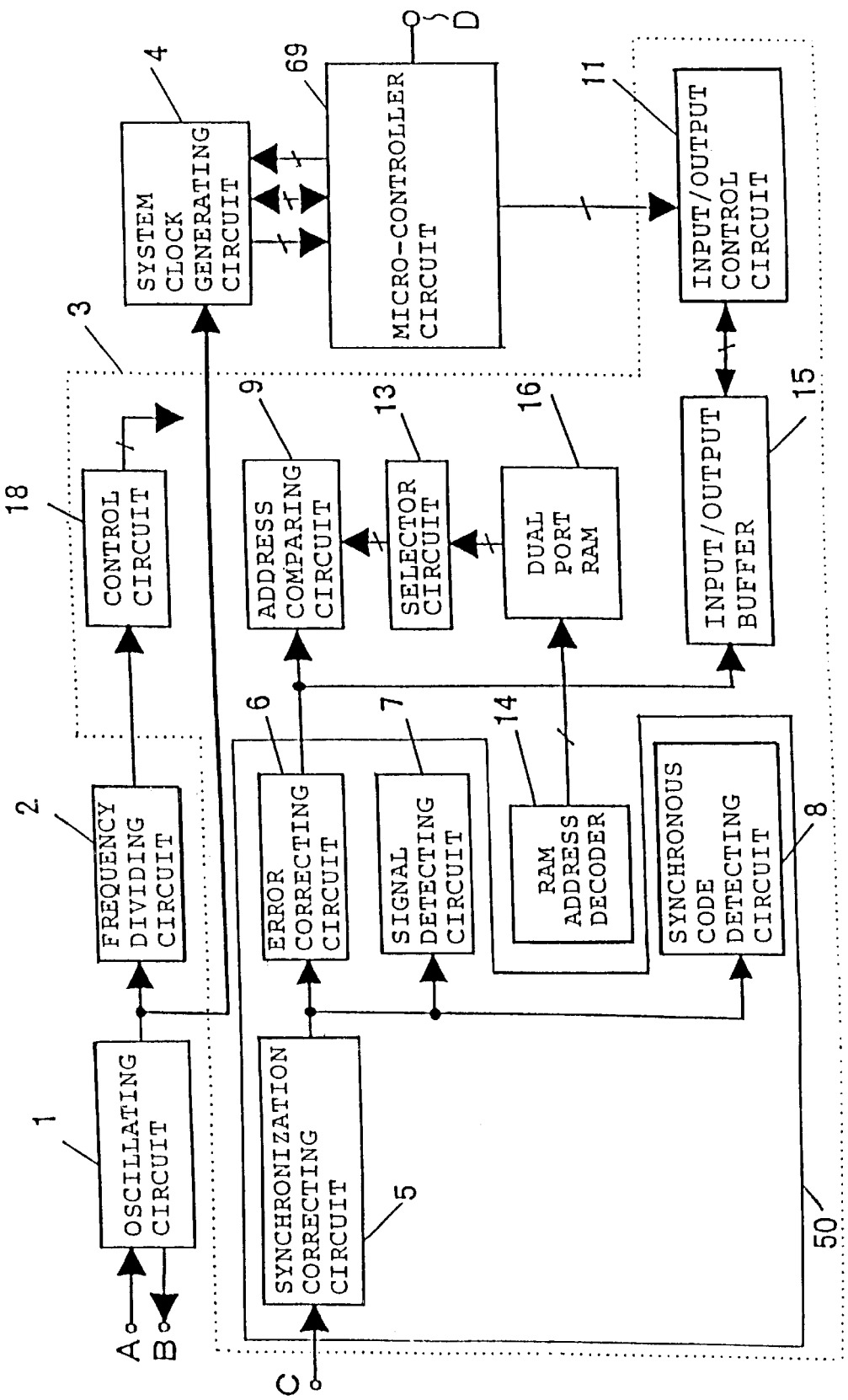
FIG. 1 is a block diagram showing an embodiment of a serial data receiving device using a semiconductor integrated circuit for communication according to the present invention.
Figure 2:
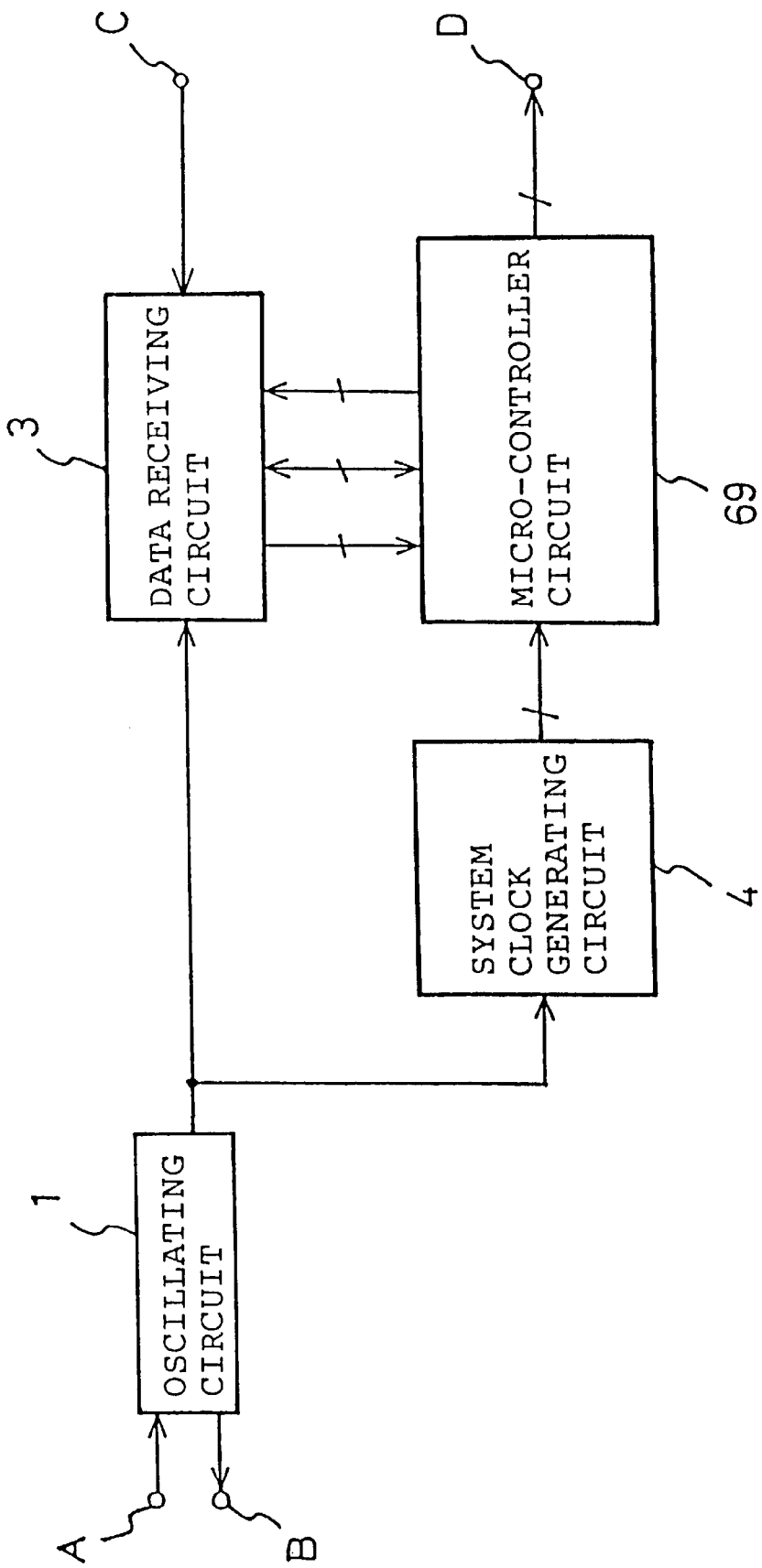
FIG. 2 is a block diagram showing a conventional serial data receiving device.
Figure 3:
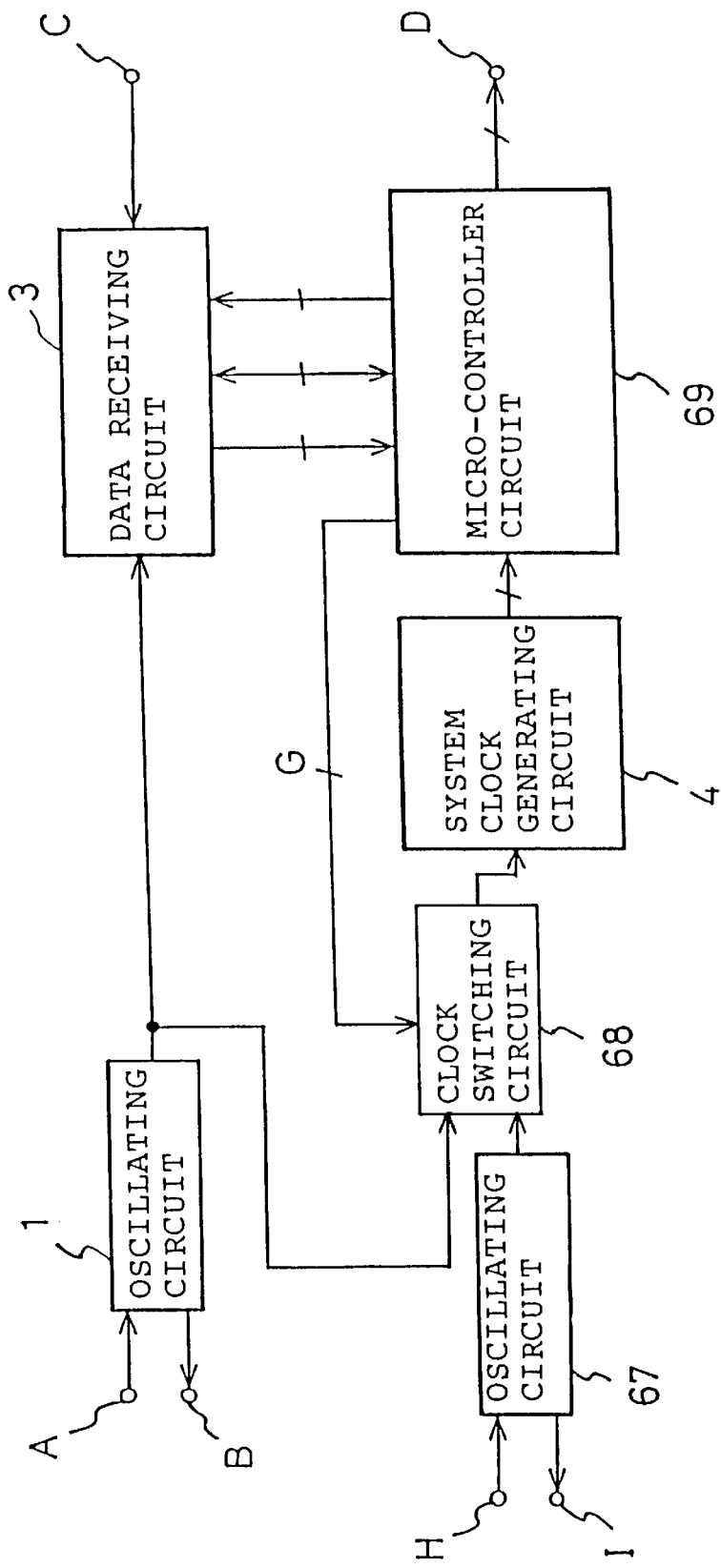
FIG. 3 is a block diagram showing another conventional serial data receiving device.

Preferred embodiments of the present invention will now be described with reference to the drawings. FIG. 1 shows a first embodiment of the present invention. In FIG. 1, a resonator (normally a crystal resonator) is connected between terminals A and B of an oscillating circuit 1. The oscillation output is sent to a frequency dividing circuit 2 and is also inputted into a system clock generating circuit 4. The output of the frequency dividing circuit 2 is sent to a data receiving circuit 3. Data is inputted into the data receiving circuit 3 through an input terminal C. The output of the system clock generating circuit 4 is inputted into a micro-controller circuit 69. The micro-controller circuit 69 determines a dividing ratio by controlling the frequency dividing circuit 2. Also, the circuit 69 controls the data receiving circuit 3 to execute setting of various parameters of the data receiving circuit, receiving data, and the like. When the processing speed of the micro-controller circuit 69 is insufficient, if the oscillation frequency of the resonator connected to the terminals A and B of the oscillating circuit is made two times higher, and the dividing ratio of the frequency dividing circuit 2 is made ½, the processing speed of the micro-controller 69 can be made two times higher without affecting data reception.

Figure 4:
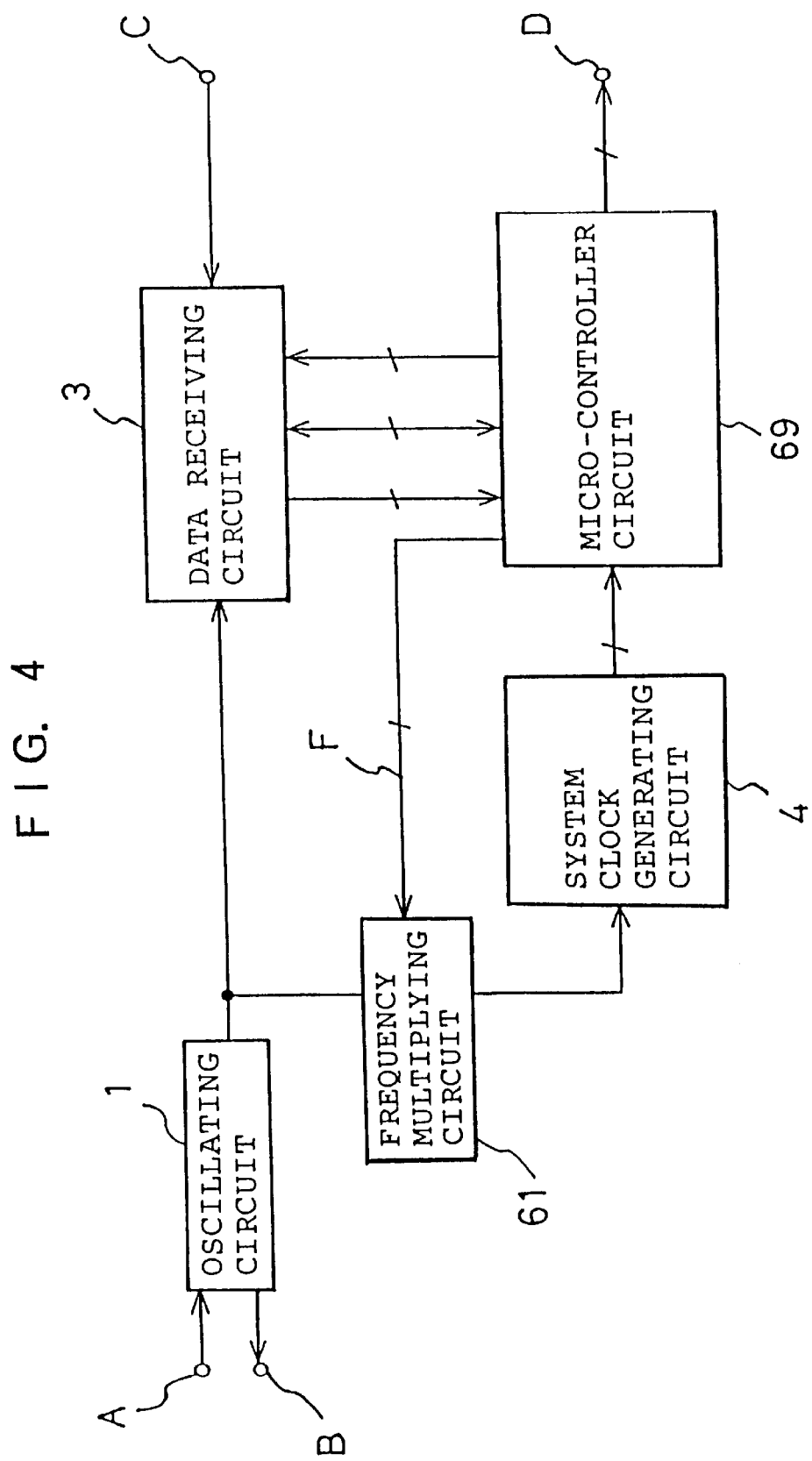
FIG. 4 is a block diagram showing another embodiment of a serial data receiving device using a semiconductor integrated circuit for communication according to the present invention.

FIG. 4 shows a second embodiment of the present invention. Instead of using the frequency dividing circuit 2 in FIG. 1, a frequency multiplying circuit 61 is placed between the output of an oscillating circuit 1 and a system clock generating circuit 4. The frequency multiplying circuit 61 is controlled by a signal F from a micro-controller circuit 69 and the magnification of the multiplying circuit is variable.

Figure 5:
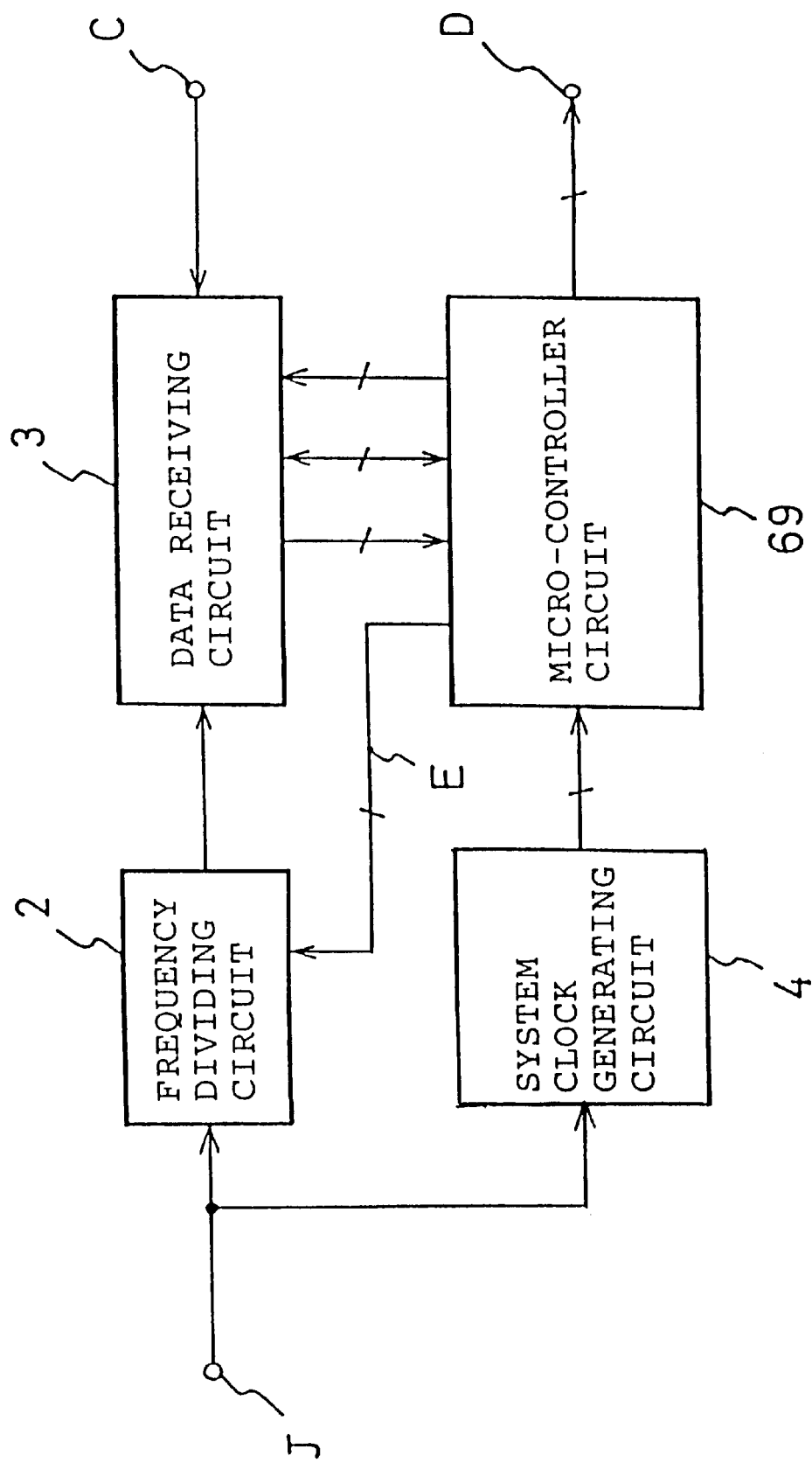
FIG. 5 is a block diagram showing a further embodiment of a serial data receiving device using a semiconductor integrated circuit for communication according to the present invention.

FIG. 5 shows a third embodiment of the present invention. Instead of the oscillating circuit 1 in FIG. 1, a clock input terminal J is provided as a reference clock generating means so that a clock as reference is inputted from the outside. The operation of each portion is similar to that in FIG. 1.

Figure 6:
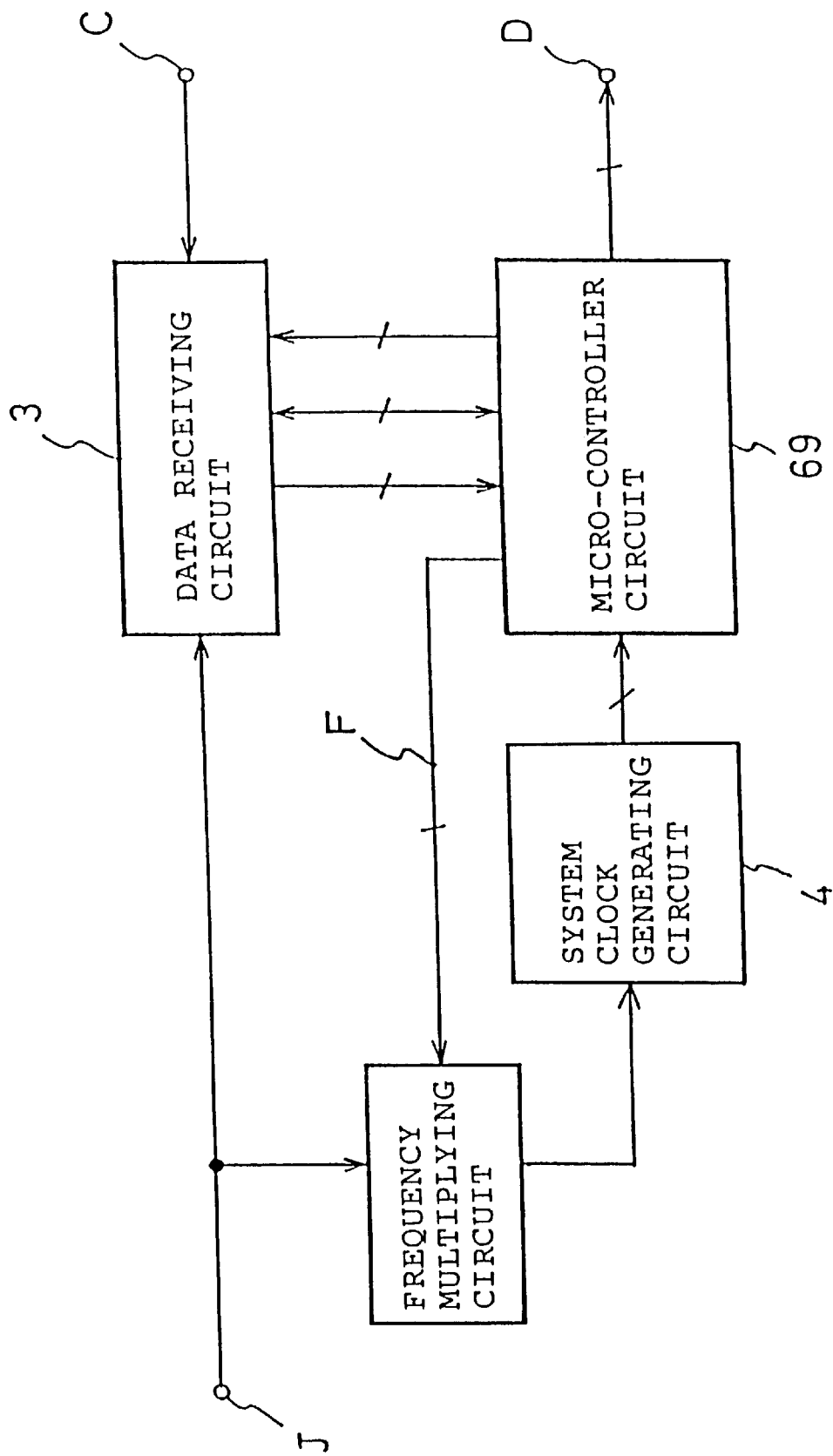
FIG. 6 is a block diagram showing a still further embodiment of a serial data receiving device using a semiconductor integrated circuit for communication according to the present invention.

FIG. 6 shows a fourth embodiment of the present invention. Instead of the oscillating circuit 1 in FIG. 4, a clock input terminal J is provided as a reference clock generating means so that a clock as reference is inputted from the outside. The operation of each portion is similar to that in FIG. 4.

Figure 7:
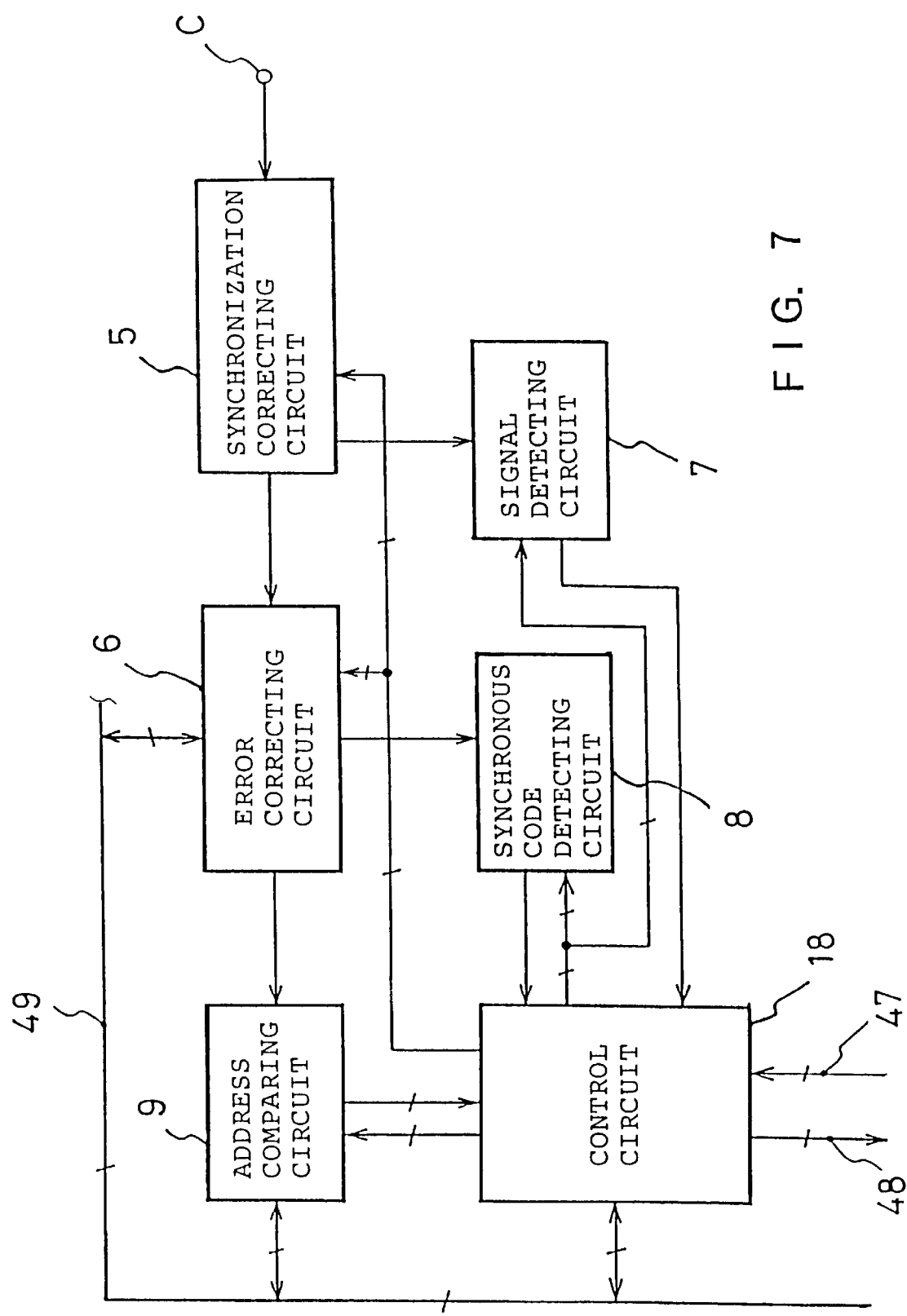
FIG. 7 is a block diagram showing a structural example of a data receiving circuit relating to a semiconductor integrated circuit for communication according to the present invention.
Figure 9:
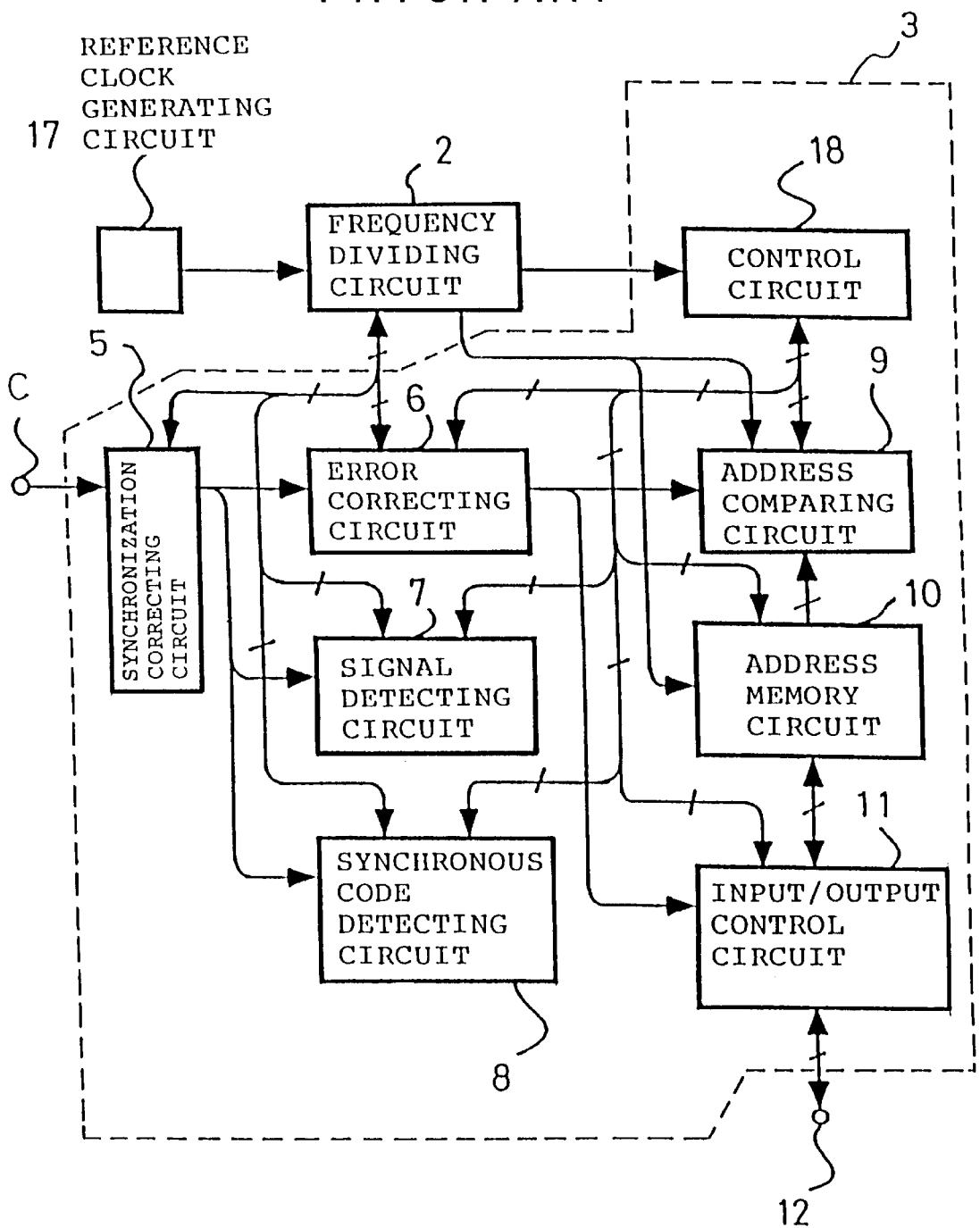
FIG. 9 is a block diagram showing a conventional semiconductor integrated circuit for communication.
Figure 10:
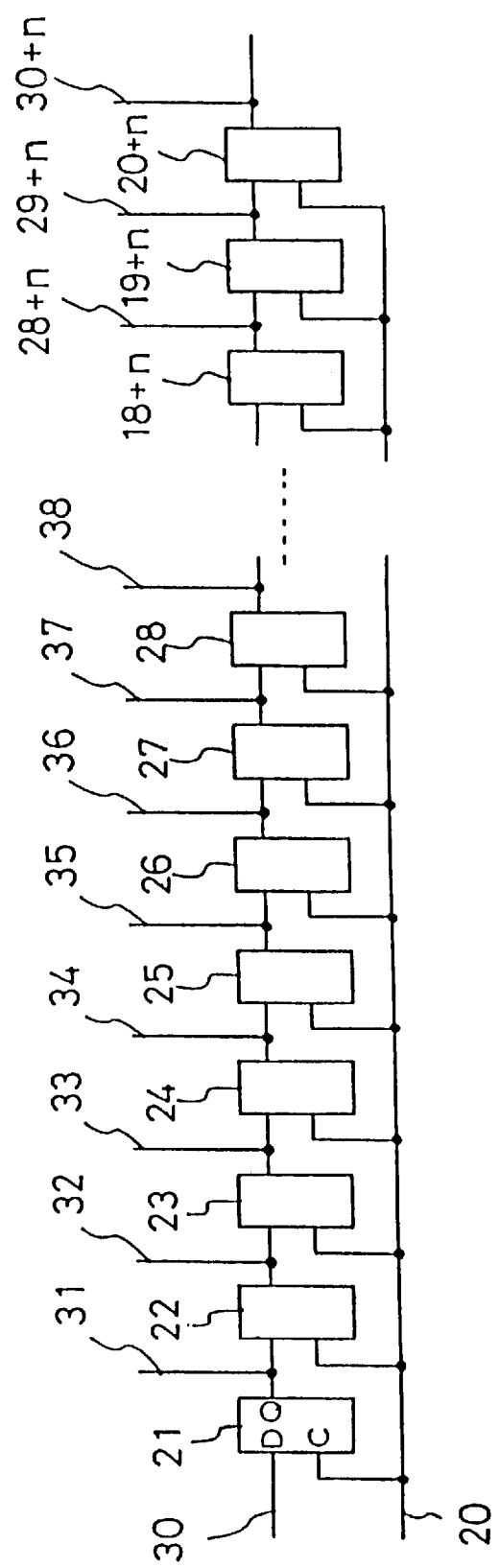
FIG. 10 is a structural example of a conventional address memory circuit.
Figure 11:
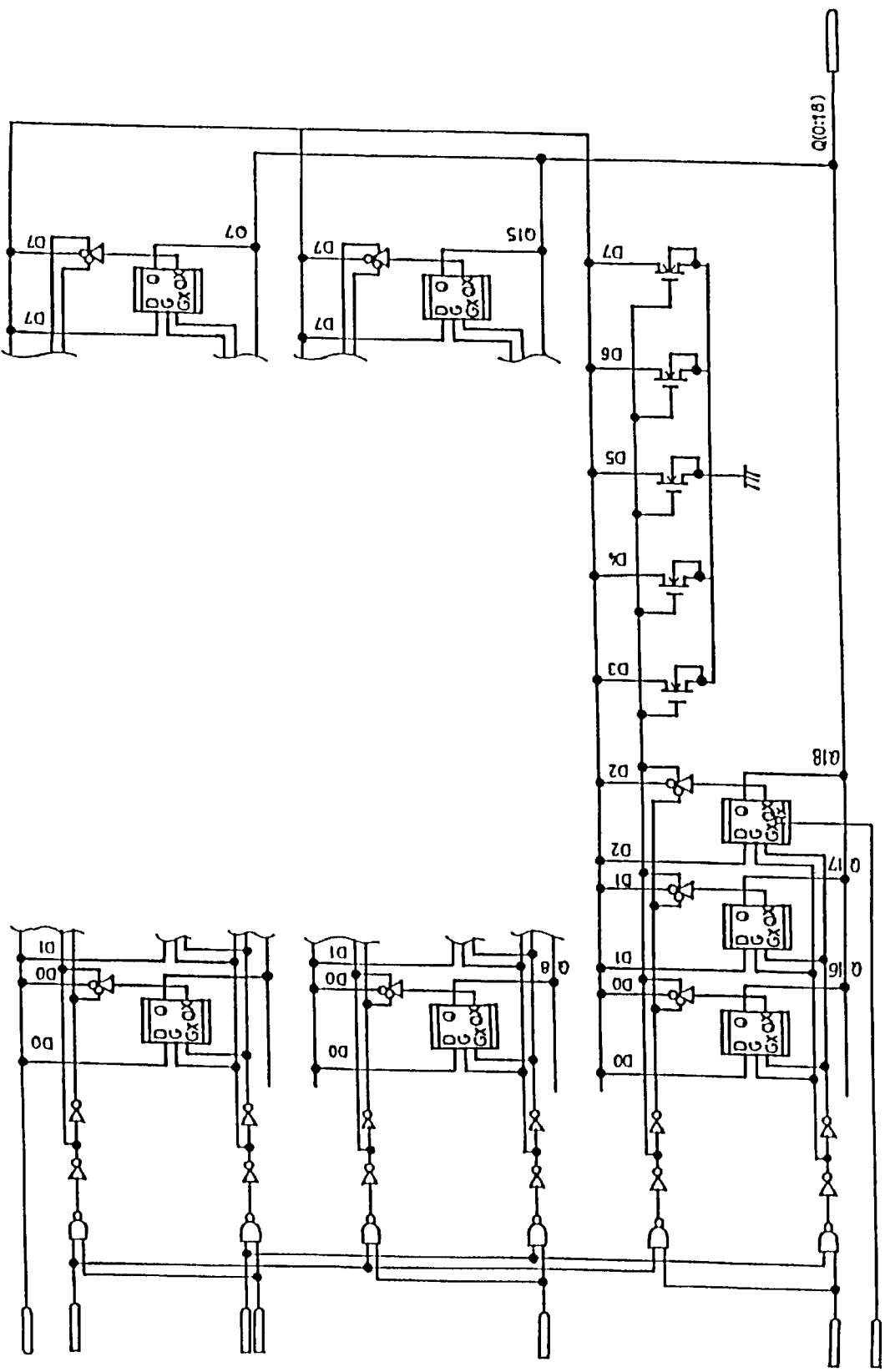
FIG. 11 is another structural example of a conventional address memory circuit.
Figure 13:
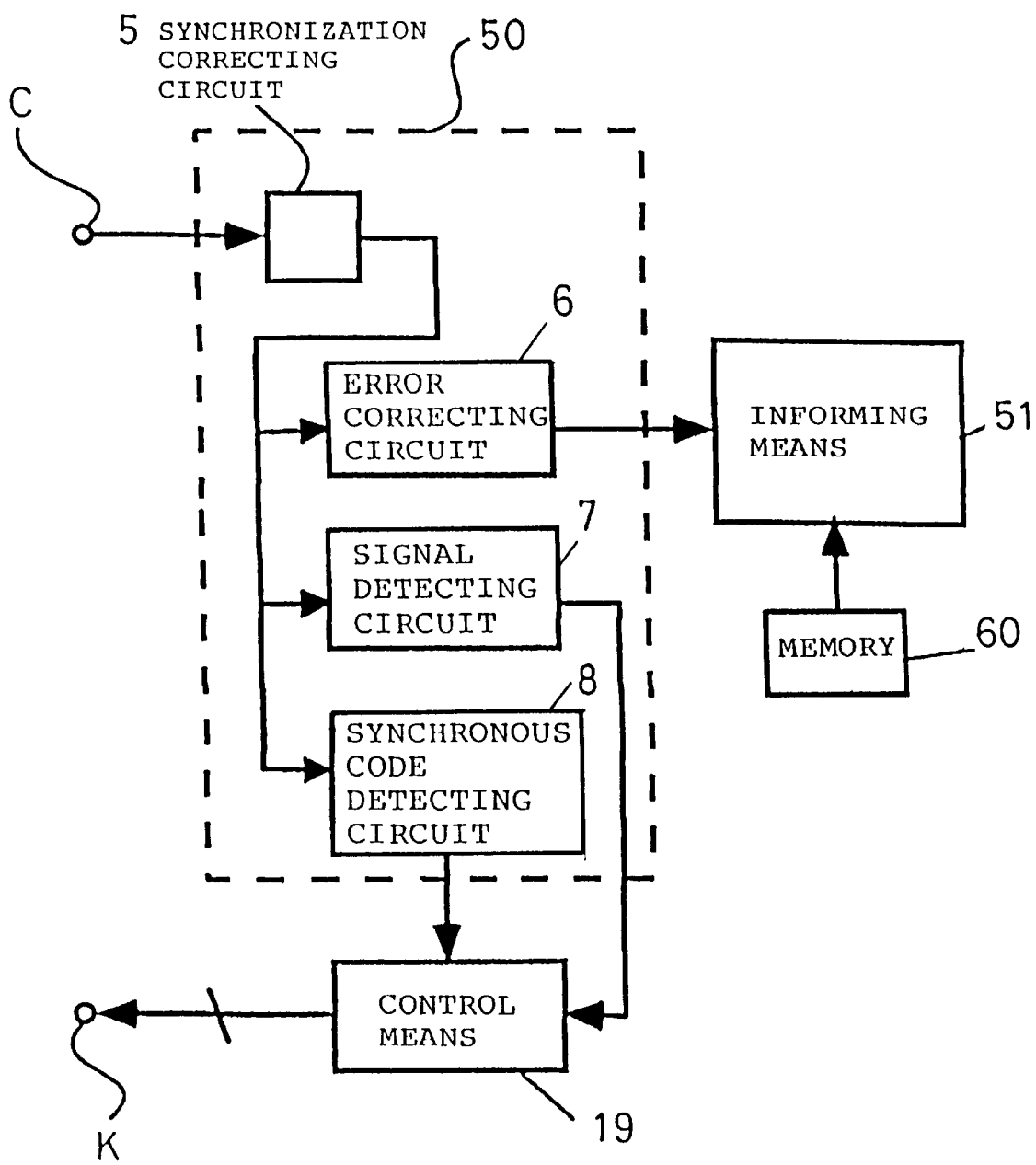
FIG. 13 is a block diagram showing a conventional IC for communication.
Figure 14:
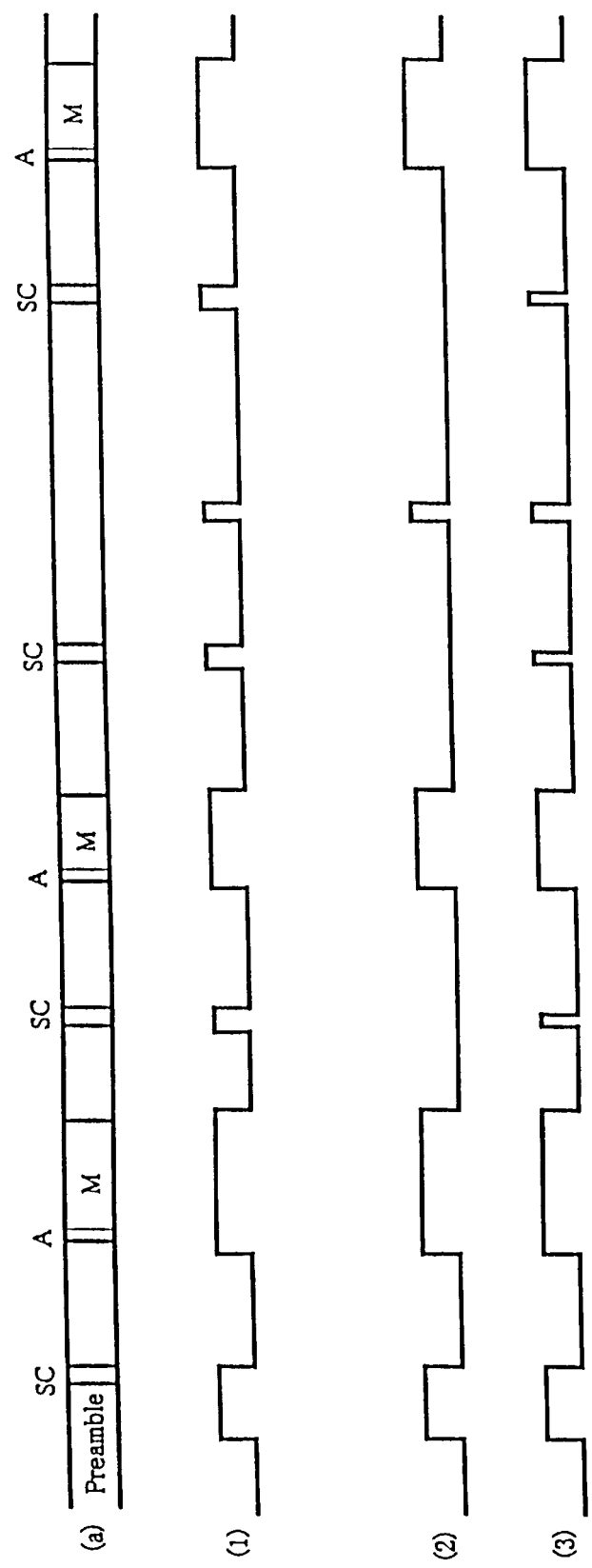

FIG. 7 is a block diagram showing a data receiving circuit 3 in the present invention. A signal from a data input terminal C is inputted into a synchronization correcting circuit 5. The output of the synchronization correcting circuit 5 is inputted into a signal detecting circuit 7 and an error correcting circuit 6. The output of the signal detecting circuit 7 is inputted into a control circuit 18, and the output of the error correcting circuit 6 is inputted into a synchronous code detecting circuit 8 and an address comparing circuit 9. The outputs of the synchronous code detecting circuit 8 and the address comparing circuit 9 are also inputted into the control circuit 18. On the other hand, the output of the control circuit 18 is supplied to other all blocks. Further, the control circuit 18 receives a data reception control signal 47 and outputs a reception process request signal 48.

The error correcting circuit 6, the address comparing circuit 9, and the control circuit 18 are respectively connected to a bus line 49.

Further embodiments of the present invention will be described with reference to the drawings. FIG. 8 shows an embodiment of an IC for communication using the present invention, which constitutes a receiver. In FIG. 8, the output of a reference clock generating circuit 17 is inputted into a frequency dividing circuit 2. A clock signal via the frequency dividing circuit 2 is inputted into a control circuit 18, and is sent to other circuit blocks. The control circuit 18 sends various timing signals to each portion of the IC to realize the functions of the IC.

A data input terminal C is connected to a synchronization correcting circuit 5. The synchronization correcting circuit 5 is connected to the frequency dividing circuit 2, an error correcting circuit 6, a signal detecting circuit 7, and a synchronous code detecting circuit 8. The error correcting circuit 6 is connected to the frequency dividing circuit 2 and the control circuit 18, and the output thereof is connected to an address comparing circuit 9 and an input/output control circuit 11. The signal detecting circuit 7 is also connected to the frequency dividing circuit 2 and the control circuit 18. Also, the synchronous code detecting circuit 8 is connected to the frequency dividing circuit 2 and the control circuit 18. The address comparing circuit 9 is connected to the error correcting circuit 6, the frequency dividing circuit 2, the control circuit 18 and a selector circuit 13. The selector circuit 13 is also connected to the frequency dividing circuit 2, the control circuit 18 and a dual port RAM 16. The dual port RAM 16 is also connected to a RAM address decoder 14 and an input/output buffer 15. The input/output buffer 15 is also connected to the control circuit 18 and the input/output circuit 11. The input/output control circuit 11 is also connected to an input/output terminal 12, the error correcting circuit 6 and the control circuit 18.

The received data is entered through the data input/output terminal C. At that time, based on the clock obtained through the frequency dividing circuit 2, the inputted data is synchronized by the synchronization correcting circuit 5. The data the value of which is determined by synchronization is inputted into the error correcting circuit 6, the signal detecting circuit 7 and the synchronous code detecting circuit 8, respectively. The error correcting circuit 6 detects and corrects errors in accordance with the kind of coding. The signal detecting circuit 7 detects a signal transmitted prior to the data and synchronous code. When the signal is detected, reception is continued and a synchronous code is waited. When the synchronous code is detected by the synchronous code detecting circuit 8, preparation for extracting data from the received signal is completed.

The number of destination is normally added to the data. This is called an address, which is set for each receiver. The address is inputted through the input/output terminal 12 prior to signal reception, and is written into the dual port RAM 16 through the input/output control circuit 11 and the input/output buffer 15. At that time, the RAM address decoder 14 specifies for which area of the RAM writing is executed. A plurality of addresses are normally written. If one of the plurality of addresses is added to the received data, it is recognized that the message is for the receiver itself, and the data is received. The address comparing circuit 9 detects the address. The address comparing circuit 9 is connected to the output of the selector circuit 13 for switching read data of the dual port RAM 16, and compares the data with the address data subjected to error correction. The comparison is carried out for all addresses set by switching the selector circuit 13 at every time when a new data bit is specified.

Since the read only output of the dual port RAM 16 can be asynchronously read like a latch, it is not necessary to provide a new clock. As a result, it becomes possible to form an IC having comparable functions by using the same clock.

In the above mentioned structure, the error correcting circuit 6, the signal detecting circuit 7 and the synchronous code detecting circuit 8 constitute a signal processing circuit which executes a desired process to data inputted through the data input terminal C.

The operation of the embodiment of the present invention will next be described in detail with reference to FIG. 1. Here, there is shown a receiving device corresponding to a POCSAG system used especially for a wireless call device or the like. In the drawing, the oscillating circuit 1 is normally formed of an oscillating circuit using the crystal resonator. The output of the oscillating circuit 1 is sent to the respective circuits through the frequency dividing circuit 2 and is inputted into the control circuit 18.

The serial data is inputted into the synchronization correcting circuit through the data input terminal C. A clock, for example, 32 times as high as the received data rate is inputted through the frequency dividing circuit 2 into the synchronization correcting circuit 5, the error correcting circuit 6, the signal detecting circuit 7 and the synchronous code detecting circuit 8. According to this, the synchronization correction is carried out at the precision of $\frac{1}{32}$ of the data rate. In the case of the POCSAG system, a clock at least 32 times as high as the data rate is normally required for the error correction and the detection of synchronous code. The output of the error correcting circuit 6 is sent to the address comparing circuit 9 at the address reception or is sent into the input/output control circuit 11 at the data (message) reception. The address comparison is carried out for new 32 bits at each time when one bit is received. The object to be compared at that time is switched by the selector circuit 13. Thus, a clock at least 32 times as high as the data rate is required also for the address comparing circuit 9 and the selector circuit 13. The address inputted into the address comparing circuit 9 as an object to be compared, is selected by the RAM address decoder 14 from the dual port RAM 16, and is inputted into the selector circuit 13. Address received through the input/output buffer 15 is previously written in the dual port RAM 16. The input/output buffer 15 executes data exchange to the input/output control circuit 11 by receiving the signal of the control circuit 18. The input/output control circuit 11 executes data exchange to the input/output buffer 15 and the input/output terminal 12 by receiving the signals of the control circuit 18 and the error correcting circuit 6.

The address memory circuit comprised of the selector circuit 13, the RAM address decoder 14, the dual port RAM 16 and the input/output buffer 15 has an area on an IC chip about $\frac{1}{3}$ times as large as a conventional address memory circuit using latches when the number of address is six. An address memory circuit originally occupies a large part of an IC chip. Thus, the effect of reduction of a chip size is large. Further, the clock frequency is not required to be changed, so that the consumed electric power is not changed. Accordingly, this embodiment can contribute to cost reduction without changing the specification.

Although the above description relates to the POCSAG decoder, it is needless to say that the present invention can be applied to other similar communication system.

Incidentally, a short oblique line given to a signal line in the present drawing and other drawings expresses that the signal line consists of a plurality of signal lines.

A further embodiment of the present invention with respect to POCSAG signals will be described with reference to the drawings. FIG. 12 shows one of examples of an IC for communication using the present invention. In FIG. 12, received and detected signals are inputted through a data input terminal C. The inputted signals are processed by a decoding means 50. First, a synchronization correcting circuit 5 synchronizes the inputted signal. When synchronization is made, a preamble or synchronous code is subsequently detected by a signal detecting circuit 7 and a synchronous code detecting circuit 8. When the preamble is detected, the control means 19 continuously outputs timing signals through a timing signal output terminal K to continue the reception. The detection result of the synchronous code is stored by a memory means 52 to operate the control means 19, and is used to control a timing signal. On the other hand, the address and message are subjected to error correction and are inputted into an informing means 51. Here, the address and message are compared with the contents of the memory 60, and if coincidence is detected, it is informed.

Figure 15:
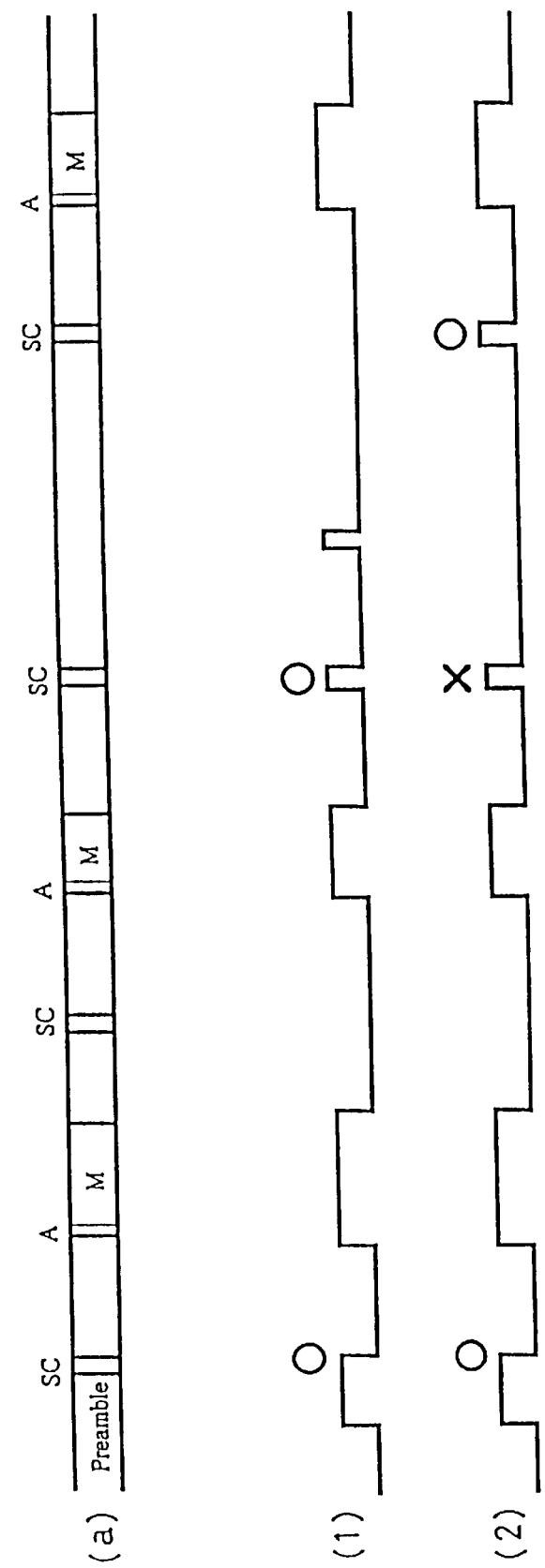

The reception is normally carried out intermittently. According to the present invention, an example of waveform of a timing signal after the preamble is detected, is as shown in FIG. 15(1). In FIG. 15(1), synchronous codes are alternately received. This is a case in which all synchronous codes are received normally. According to this, the battery saving efficiency of a receiver is increased. Since the preamble is longer than the interval of the synchronous codes, even if this method is adopted, the reception of a newly received preamble can not be failed. FIG. 15(2) shows another example of a waveform of a timing signal of the present invention. In this case, since a third synchronous code fails to be received, a next synchronous code is received. In the case where the synchronous code is not detected even by this procedure, it is judged that the transmission is ended.

Here, although the decoding means is formed by the combination of circuit blocks, it is needless to say that it can be formed by a software or the like.

Further, the present invention will be described in detail with reference to the drawings. FIG. 1 is a block diagram showing the first embodiment of a semiconductor integrated circuit for communication according to the present invention. In the drawing, the resonator (crystal resonator or the like) is connected between the input/output terminals A and B of the oscillating circuit 1. This embodiment uses the crystal resonator having an oscillating frequency of 76.8 kHz. The signals of 76.8 kHz outputted from the oscillating circuit 1 as a reference clock generating means are respectively inputted into the frequency dividing circuit 2 and the system clock generating circuit 4. The frequency dividing circuit 2 supplies signals of various frequencies necessary for the data receiving circuit 3. In this embodiment, since data reception is executed at 2400 bps, a signal of 2.4 kHz as a reference signal and a clock of 38.4 kHz for processing the received data are supplied to the data receiving circuit 3. The frequency dividing circuit 2 is controlled by a control signal E (not shown) of the micro-controller circuit 69. The control signal E will be described later.

The data receiving circuit 3 is also controlled by the micro-controller circuit 69, and data is entered through the terminal C. The inputted data is read into the micro-controller circuit 69, and together with the output of an arrival signal, it is stored or displayed. Such an arrival signal and display output are collectively expressed by a terminal D. The output of the system clock generating circuit 4 is inputted into the micro-controller circuit 69, and is used to operate the system. A clock generated by the system clock generating circuit 4 has a frequency of 76.8 kHz in this embodiment. That is, the system clock of the micro-controller circuit 69 has a frequency of 76.8 kHz.

In case that the semiconductor integrated circuit for communication according to the present invention is used for a pager requiring a high level processing, the processing speed of the micro-controller circuit 69 may be insufficient under the above mentioned operation conditions. In this case, the oscillating frequency of the oscillator is made a double frequency of 153.6 kHz. The frequency dividing circuit 2 is controlled by the control signal E to execute additional dividing of one more step (½ dividing) than before. As a result, since the data receiving circuit 3 can receive data at 2400 bps, the frequency of the system clock of the micro-controller circuit 69 becomes a double frequency of 153.6 kHz without giving any influence to the data receiving operation, so that the data processing capability is made double. Since the control signal E is determined by a program of the micro-controller circuit 69, it is set for each product. Although the oscillating frequency of the oscillating circuit 1 is made double in this embodiment, it is needless to say that the present invention is not limited to this.

Further, although the inputs of the system clock generating circuit 4 and the frequency dividing circuit 2 are directly connected to the output of the oscillating circuit 1, divided output of the oscillating circuit 1 may be inputted.

As is apparent from the above description, the semiconductor integrated circuit for communication according to the present invention can be adapted for a popular pager to a high performance pager with the same semiconductor integrated circuit.

FIG. 4 shows the second embodiment of the semiconductor integrated circuit for communication according to the present invention. In the drawing, the resonator (crystal resonator or the like) is connected between the input/output terminals A and B of the oscillating circuit 1. In this embodiment, the oscillating frequency of the resonator is 38.4 kHz. The outputs of the oscillating circuit 1 as a reference clock generating means are respectively inputted into the frequency multiplying circuit 61 and the data receiving circuit 3. The frequency multiplying circuit 61 is controlled by the control signal F of the micro-controller circuit 69, and the output thereof is inputted into the system clock generating circuit 4. In this embodiment, the multiplying number of the frequency multiplying circuit 61 is set double by the control signal F. Accordingly, a signal of 76.8 kHz is inputted into the system clock generating circuit 4, and the circuit 4 supplies the system clock of 76.8 kHz as a system clock of the micro-controller circuit 69.

The data receiving circuit 3 is also controlled by the micro-controller circuit 69, and data is entered through the terminal C. In this embodiment, a frequency signal necessary for the data receiving circuit 3, is generated based on the input signal of 38.4 kHz in the inside of the data receiving circuit 3. It is needless to say that the signal may be generated between the oscillating circuit 1 and the data receiving circuit 3. The inputted data is read into the micro-controller circuit 69, and together with the output of an arrival signal, it is stored or displayed. Such an arrival signal and display output are collectively expressed by the terminal D. The signal of 76.8 kHz as the output of the system clock generating circuit 4 is inputted into the micro-controller circuit 69 and is used to operate the system.

In case that the semiconductor integrated circuit for communication according to the present invention is used for a pager requiring a high level processing, the processing speed of the micro-controller circuit 69 may be insufficient under the above mentioned conditions. In this case, a clock having a frequency of 153.6 kHz four times as high as the oscillating output is generated by the frequency multiplying circuit 61 while the oscillating frequency of 38.4 kHz of the resonator remains as it is. As a result, data processing capability of the micro-controller circuit 69 is made double without giving any influence to the data receiving circuit 3.

In this embodiment, the oscillating frequency of the oscillating circuit 1 is 76.8 kHz and the magnification of the frequency multiplying circuit 61 is made one, and when the IC is used for a pager performing a high speed processing, the magnification of the frequency multiplying circuit 61 may be made double.

As is apparent from the above description, the semiconductor integrated circuit for communication according to the present invention can be adapted for a popular pager to a high performance pager with the same semiconductor integrated circuit.

FIG. 5 is a block diagram showing the third embodiment of the semiconductor integrated circuit for communication according to the present invention. In the drawing, the clock input terminal J is connected to the frequency dividing circuit 2 and the system clock generating circuit 4. The reference clock inputted from the clock input terminal J is inputted into the system clock generating circuit 4 to form a system clock for the micro-controller circuit 69, while being divided by the frequency dividing circuit 2 to be inputted into the data receiving circuit 3. In this embodiment, the frequency of the clock inputted through the terminal J is 76.8 kHz.

In case that the semiconductor integrated circuit for communication according to the present invention is used for a high performance pager, similarly to the first embodiment, the frequency of the clock inputted through the clock input terminal J is made a double frequency of 153.6 kHz, and a signal divided for one more step is used as the output of the frequency dividing circuit 2 to be inputted into the data receiving circuit 3. Since other components are the same as FIG. 1, the detailed description thereof will be omitted by designating similar reference characters.

FIG. 6 is a block diagram showing the fourth embodiment of the semiconductor integrated circuit for communication according to the present invention. In the drawing, the clock input terminal J is connected to the frequency multiplying circuit 61 and the system clock generating circuit 4. The reference clock inputted through the clock input terminal J is inputted into the data receiving circuit 3, while after being multiplied by the frequency multiplying circuit 61, the clock is inputted into the system clock generating circuit 4 to form a system clock for the micro-controller circuit 69. In this embodiment, the frequency of the clock inputted into the clock input terminal J is 38.4 kHz, and the magnification of the frequency multiplying circuit 61 is made double.

In case that the semiconductor integrated circuit for communication according to the present invention is used for a high performance pager, similarly to the second embodiment, the magnification of the frequency multiplying circuit 61 is made four times while the frequency of the clock inputted through the clock input terminal J is not changed to keep 38.4 kHz. Since other components are similar to those in FIG. 4, the detailed description thereof will be omitted by designating similar reference characters.

FIG. 7 is a block diagram showing the structure of the data receiving circuit used in the semiconductor integrated circuit for communication according to the present invention.

Using a pager as an example, the operation of the circuit will be described with reference to the drawing. The synchronization correcting circuit 5 synchronizes the serial data inputted from the data input terminal C. The thus entered data is first compared with specific codes (preamble and synchronous code, respectively) by the signal detecting circuit 7 and the synchronous code detecting circuit 8, the detection thereof is made. Normally, the preamble is first detected by the signal detecting circuit 7. Then, the signal detecting circuit 7 sends a signal to the control circuit 18. The data entry is continuously made by the control circuit 18. Subsequently, when the synchronous code is detected by the synchronous code detecting circuit 8, synchronization is made. The detection of the address code received through a predetermined time slot is made by the address comparing circuit 9. When the address code is detected, the message is subsequently inputted. When the message is received, it is first corrected by the error correcting circuit 6. The corrected message data together with the information with respect to the error are sent to the outside through the bus line 49. The control circuit 18 is controlled by the data receiving control signal 47, and outputs the receiving process request signal 48. The data receiving control signal 47 includes a clock signal adapted for the control data rate for reception and a control signal from the micro-controller. The receiving process request signal 48 includes an interruption signal requesting for the micro-controller at data reception and a signal for monitoring the receiving state, quality of a receiving signal or the like.

Figure 16:
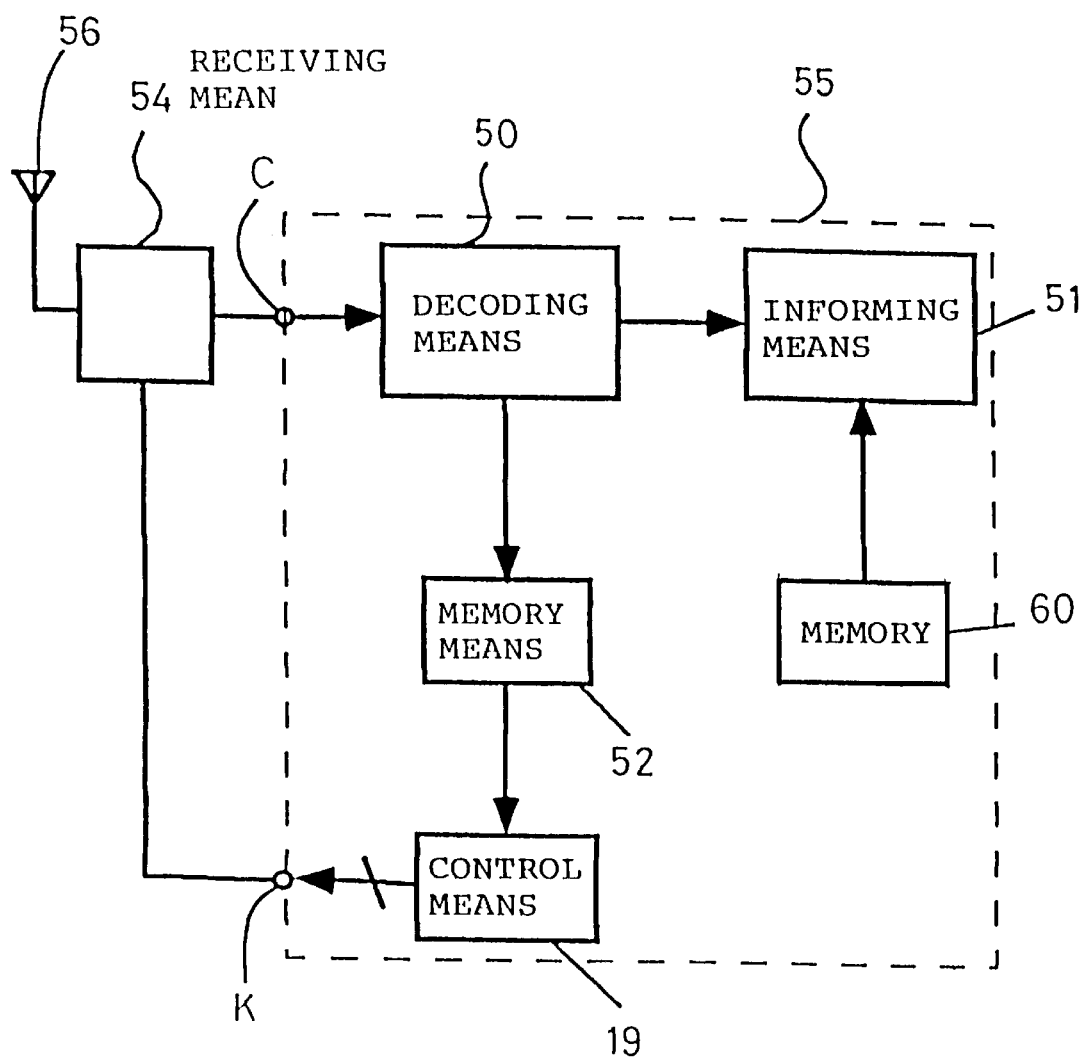
FIG. 16 is a structural view showing a receiver using an IC for communication according to the present invention.

Subsequently, the present invention will be described in detail with reference to the drawings. Here, the operation of a wireless call receiver receiving POCSAG signals will be particularly described. FIG. 16 is a structural view showing a receiver using an IC for communication according to the present invention. In the drawing, the POCSAG signals transmitted from a transmitter are received and detected by a receiving means 54 through an antenna 56. The detected signals are inputted through a data input terminal C. The data input terminal C is connected to a decoding means 50, and necessary messages are extracted from the POCSAG signals and are sent to an informing means 51. The informing means 51 compares the address of the receiver itself written into a memory 60 with the output of the decoding means 50, and if they coincide with each other, the informing means informs the outside of the coincidence. Specifically, using electrical signals for example, the informing means outputs sound, light, oscillation or the like.

The decoding means 50 detects the preamble and synchronous code in the POCSAG signal to execute error correction. When the decoding means receives the synchronous code, the detection or non-detection thereof is stored in the memory means 52. The stored information is inputted into the control means 19 which controls a timing signal for making the receiving means 54 execute intermittent reception.

FIGS. 15(1) and 15(2) show waveforms of the timing signals in the present invention.

When the signal is in an "H" level, the receiving means 54 is in the operating state. In FIG. 15(1), when the preamble is first detected, the reception continues until the synchronous code is subsequently transmitted. When the synchronous code is detected, a self frame is next received, and the next synchronous signal is not received. When a self frame is again received, the next synchronous code is received. Here, if the synchronous code is detected without trouble, the second synchronous code is received. That is, the synchronous codes are alternately detected. When the synchronous code can not be received on the way, as shown in FIG., 15(2), re-synchronization is carried out by the synchronous code immediately thereafter.

Although one typical timing signal is shown, a plurality of signals are necessary according to the structure of the receiving means. Thus, in the block diagram, a short oblique line is added to the signal line of the timing signal output terminal K so as to indicate that the signal line may be a plurality of lines.

The receiving frequency of the synchronous codes is not limited to the alternate reception as in the embodiment. The present invention includes a case in which the synchronous codes are received at a predetermined frequency.

INDUSTUIAL APPLICABILITY

As described above, according to the present invention, when serial data is received, a common oscillating circuit is used, and a data receiving circuit and a micro-controller for controlling the former are controlled by independent clocks, so that the invention can easily deal with the change of data rate or data process load. That is, the invention can be adapted for a popular specification to a high performance specification by using the same semiconductor integrated circuit for communication.

Further, as mentioned above, according to the present invention, by using the dual port RAM as the address memory circuit, similar functions can be realized at a low chip cost without affecting necessary clock frequencies.

Further, as described above, according to the present invention, while monitoring the synchronization state, the consumed power of a receiver can be decreased suitably with little influence to normal reception. Also, by decreasing the consumption power of the receiver in the synchronization state, not only a battery lifetime can be prolonged, but also the invention can deal with such a receiver that transmission is executed while synchronization is always made.

Further, design of such a receiving system is made easy by integration.

What is claimed is:

1. A semiconductor integrated circuit for communication, comprising:
    reference clock generating means for generating a reference clock signal;
    a system clock generating circuit connected to the reference clock generating means for generating a system clock based on the reference clock signal;
    a frequency dividing circuit connected to the reference clock generating means for dividing the reference clock signal to produce a frequency-divided clock signal;
    a micro-controller circuit having a clock input line connected to the system clock generating circuit; and
    a data receiving circuit connected to the frequency dividing circuit;
    whereby the reference clock generating means serves as a common source for the generation of independent clock signals used to drive the data receiving circuit and the micro-controller at the same or different clock rates.

2. A semiconductor integrated circuit for communication according to claim 1; wherein a dividing ratio of the frequency dividing circuit is controlled by the micro-controller circuit.

3. A semiconductor integrated circuit for communication according to claim 2; wherein the data receiving circuit includes a synchronization correcting circuit which receives the frequency divided clock signal output by the frequency dividing circuit.

4. A semiconductor integrated circuit for communication, comprising:
    reference clock generating means for generating a reference clock signal;
    a frequency multiplying circuit connected to the reference clock generating means for multiplying the reference clock signal to produce a frequency-multiplied clock signal;
    a data receiving circuit having a clock input connected to the reference clock generating means;
    a system clock generating circuit connected to the frequency multiplying circuit for generating a system clock based on the frequency-multiplied clock signal; and
    a micro-controller circuit having a clock input line connected to the system clock generating circuit;
    whereby the reference clock generating means serves as a common source for the generation of independent clock signals used to drive the data receiving circuit and the micro-controller at the same or different clock rates.

5. A semiconductor integrated circuit for communication according to claim 4; wherein a multiplying ratio of the frequency multiplying circuit is controlled by the micro-controller circuit.

6. A semiconductor integrated circuit for communication according to claim 5; wherein the data receiving circuit includes a synchronization correcting circuit which receives a clock output of the reference clock generating means.

7. A semiconductor integrated circuit for communication, comprising:
    reference clock generating means for generating a reference clock signal;
    a frequency dividing circuit connected to the reference clock generating means;
    a control circuit connected to the frequency dividing circuit;
    a signal processing circuit connected to the frequency dividing circuit for receiving and processing data from an input terminal;
    an address comparing circuit connected to an output of the signal processing circuit and controlled by the control circuit;
    an address memory circuit comprised of a dual port RAM for outputting a set address to the address comparing circuit; and
    an input/output control circuit connected to the control circuit, the output of the signal processing circuit and the address memory circuit, outputting processed data to an output terminal, and inputting address data into the address memory circuit.

8. A semiconductor integrated circuit for communication according to claim 7; wherein the signal processing circuit includes a synchronization correcting circuit connected to the input terminal, an error correcting circuit for receiving an output of the synchronization correcting circuit and being connected to the frequency dividing circuit and the control circuit, a signal detecting circuit, and synchronous code detecting circuit.

9. A semiconductor integrated circuit for communication according to claim 7; wherein the signal processing circuit comprises a data receiving circuit and a micro-controller; the system clock generating circuit generates a system clock based on the reference clock signal for driving the signal processing circuit; and the frequency dividing circuit divides the reference clock signal to produce a frequency-divided clock signal for driving the micro-controller.

10. A semiconductor integrated circuit for communication, comprising:

an input terminal for inputting a signal obtained by a receiver external to the integrated circuit by receiving and demodulating a signal transmitted through a communication channel;

decoding means for decoding a coded signal received from the input terminal;

a memory for storing a call number of a station;

informing means electrically connected to the decoding means and the memory and for informing that a call to the station has been made when it is detected that a decoded signal coincides with the call number of the station;

memory means for storing an occurrence of detection each time periodically transmitted synchronous signals are received; and control means for outputting timing signals for intermittently supplying electric power to the external receiver;

wherein the control means controls a receiving operation at timing of the synchronous signals based on information stored in the memory means.

11. A method of saving a battery of a semiconductor integrated circuit for communication, comprising the steps of:

controlling the supply of timing signals used to supply electric power to a receiver external of the integrated circuit so that no timing signal is output at a timing of synchronous signals for a predetermined number of times since a periodically transmitted synchronous signal has been detected;

outputting the timing signal for supplying the electric power to the receiver to perform re-synchronization at the timing of a next synchronous signal after the predetermined number of times; and outputting the timing signal to perform re-synchronization at the timing of a further next synchronous signal if an immediately preceding re-synchronization attempt has failed after detecting the periodically transmitted synchronous signal.

12. A method of saving a battery of a semiconductor integrated circuit for communication, comprising the steps of:

controlling the supply of timing signals used to supply electric power to a receiver external of the integrated circuit so that no timing signal is output at a timing of a synchronous signal next to a detected periodically transmitted synchronous signal;

outputting the timing signal for supplying the electric power to the receiving means to perform re-synchronization at the timing of a synchronous signal further next to the detected synchronous signal; and outputting the timing signal to perform re-synchronization at timing of a synchronous signal next to the synchronous signal for a previous re-synchronization attempt if the previous re-synchronization attempt has failed after detecting the periodically transmitted synchronous signal.

13. A communication integrated circuit device comprising: an oscillator for generating a first clock signal; a data receiving circuit for receiving transmitted data; a microcontroller for controlling the data receiving circuit; and circuitry comprising one of a frequency divider and a frequency multiplier for receiving the first clock signal and generating a second clock signal; wherein the second clock signal is supplied to one of the microcontroller and the data receiving circuit so that the microcontroller and the data receiving circuit may be driven at different clock speeds derived from the aforesaid oscillator.

14. A communication integrated circuit according to claim 13; further comprising clock generating means for generating a system clock based on the first clock signal, the microcontroller being driven by the system clock signal; and the circuitry comprises a frequency divider for producing a frequency-divided output signal as the second clock signal for driving the data receiving circuit.

15. A communication integrated circuit according to claim 14; wherein a dividing ratio of the frequency divider is controlled by the microcontroller.

16. A communication integrated circuit according to claim 13; wherein the circuitry comprises a frequency divider and the data receiving circuit includes a synchronization correcting circuit which receives a clock output of the frequency divider.

17. A communication integrated circuit according to claim 13; wherein the circuitry comprises a frequency multiplier; and further comprising clock generating means connected to an output of the frequency multiplier for generating a system clock based on the second clock signal, the microcontroller being driven by the system clock signal and the data receiving circuit being driven by the first clock signal.

18. A communication integrated circuit according to claim 13; wherein the circuitry comprises a frequency divider, the microcontroller comprises a control circuit driven by the frequency divider, a signal processing circuit connected to the frequency divider for receiving and processing data input from an input terminal, an address comparing circuit connected to an output of the signal processing circuit and controlled by the control circuit for comparing an address in received data with a set address; an address memory circuit comprised of a dual port RAM for storing and outputting the set address to the address comparing circuit, and an input/output control circuit connected to the control circuit, the output of the signal processing circuit and the address memory circuit for outputting processed data to an output terminal, and inputting address data into the address memory circuit.

19. A semiconductor integrated circuit for communication according to claim 18; wherein the signal processing circuit includes a synchronization correcting circuit connected to the input/output terminal, an error correcting circuit for receiving an output of the synchronization correcting circuit and being connected to the frequency dividing circuit and the control circuit, a signal detecting circuit, and a synchronous code detecting circuit.

* * * * *